(12) United States Patent
Ito

(10) Patent No.: US 11,327,369 B2
(45) Date of Patent: May 10, 2022

(54) ELECTRO-OPTICAL DEVICE AND ELECTRONIC APPARATUS

(71) Applicant: SEIKO EPSON CORPORATION, Tokyo (JP)

(72) Inventor: Satoshi Ito, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 16/953,279

(22) Filed: Nov. 19, 2020

(65) Prior Publication Data
US 2021/0157190 A1 May 27, 2021

(30) Foreign Application Priority Data

Nov. 25, 2019 (JP) .............................. JP2019-212095

(51) Int. Cl.
| | | |
|---|---|---|
| G02F 1/1339 | (2006.01) | |
| G02F 1/1335 | (2006.01) | |
| G02F 1/1333 | (2006.01) | |
| G02F 1/1337 | (2006.01) | |

(52) U.S. Cl.
CPC .... *G02F 1/13394* (2013.01); *G02F 1/133345* (2013.01); *G02F 1/133512* (2013.01); *G02F 1/133723* (2013.01); *G02F 2201/123* (2013.01)

(58) Field of Classification Search
CPC .......... G02F 1/13394; G02F 1/133512; G02F 1/13398; G02F 1/136209; G02F 1/136219; G02F 1/167; G02F 1/1679; G02F 2201/50; G02F 2201/501; G02F 2201/07
See application file for complete search history.

(56) References Cited

U.S. PATENT DOCUMENTS

| | | | |
|---|---|---|---|
| 6,870,592 B1 | 3/2005 | Yamamoto et al. | |
| 2005/0052607 A1* | 3/2005 | Mori | .................... G02F 1/13394 |
| | | | 349/155 |
| 2013/0222723 A1* | 8/2013 | Kim | ........................ H01L 33/58 |
| | | | 349/40 |
| 2018/0284523 A1* | 10/2018 | Higano | ............. G02F 1/136286 |

FOREIGN PATENT DOCUMENTS

JP          2001005006          1/2001

\* cited by examiner

*Primary Examiner* — Angela K Davison
(74) *Attorney, Agent, or Firm* — JCIPRNET

(57) ABSTRACT

An electro-optical device includes a first substrate including a layered body including a plurality of insulating layers, and a pixel electrode disposed at the layered body, a second substrate including a common electrode, an electro-optical layer disposed between the pixel electrode and the common electrode, the electro-optical layer having optical characteristics varying according to an electric field, a spacer coupled to the first substrate, the spacer defining a distance between the pixel electrode and the common electrode, in which the spacer has a first portion overlapping with the pixel electrode when viewed in a thickness direction of the first substrate, and a second portion not overlapping with the pixel electrode when viewed in the thickness direction.

8 Claims, 9 Drawing Sheets

ELECTRO-OPTICAL DEVICE AND ELECTRONIC APPARATUS

The present application is based on, and claims priority from JP Application Serial Number 2019-212095, filed Nov. 25, 2019, the disclosure of which is hereby incorporated by reference herein in its entirety.

BACKGROUND

1. Technical Field

The present disclosure relates to an electro-optical device and an electronic apparatus.

2. Related Art

For an electronic apparatus such as a projector, an electro-optical device such as a liquid crystal device configured to change optical characteristics for each of the pixel is generally used. There is disclosed in JP 2001-5006 A, the liquid crystal device including a Thin Film Transistor (TFT) substrate at which a plurality of pixel electrodes are formed, a counter substrate including a common electrode, and a liquid crystal interposed between the two substrates. There is also disclosed in JP 2001-5006 A, a spacer in a columnar shape for defining a gap between the two substrates. The spacer is formed on the pixel electrode.

In JP 2001-5006 A, the spacer is disposed only in a region encompassed by the pixel electrode when viewed in plan view. Accordingly, in the related art, when intending to sufficiently obtain an adhesiveness of the spacer to the pixel electrode, a ratio of an area occupied by the spacer on the pixel electrode increases, to thus decrease the opening ratio. Thus, there is an issue in that it is difficult to cause the spacer to stabilize a distance between the two substrates while suppressing a decrease in the opening ratio.

SUMMARY

An aspect of the electro-optical device according to the present disclosure includes a first substrate including a layered body including a plurality of insulating layers, and a pixel electrode disposed at the layered body, a second substrate including a common electrode, an electro-optical layer coupled between the pixel electrode and the common electrode, the electro-optical layer having optical characteristics varying according to an electric field, a spacer coupled to the first substrate, the spacer defining a distance between the pixel electrode and the common electrode, in which the spacer has a first portion overlapping with the pixel electrode when viewed in a thickness direction of the first substrate, and a second portion not overlapping with the pixel electrode when viewed in the thickness direction.

BRIEF DESCRIPTION OF THE DRAWINGS

FIG. 7 is a view for explaining a method for forming a protection layer and the like.

DESCRIPTION OF EXEMPLARY EMBODIMENTS

Hereinafter, preferred embodiments of the present disclosure will be described with reference to the accompanying drawings. Note that, in the figures, dimensions and scales of sections are differed from actual dimensions and scales as appropriate, and some of the sections are schematically illustrated to facilitate a recognition of the sections. Also, the scope of the present disclosure is not limited to these embodiments unless otherwise stated to limit the present disclosure in the following description.

1. Electro-Optical Device

A liquid crystal device of an active matrix scheme will be described as an example of an electro-optical device of the present disclosure.

1A. Basic Configuration

Figure 1:
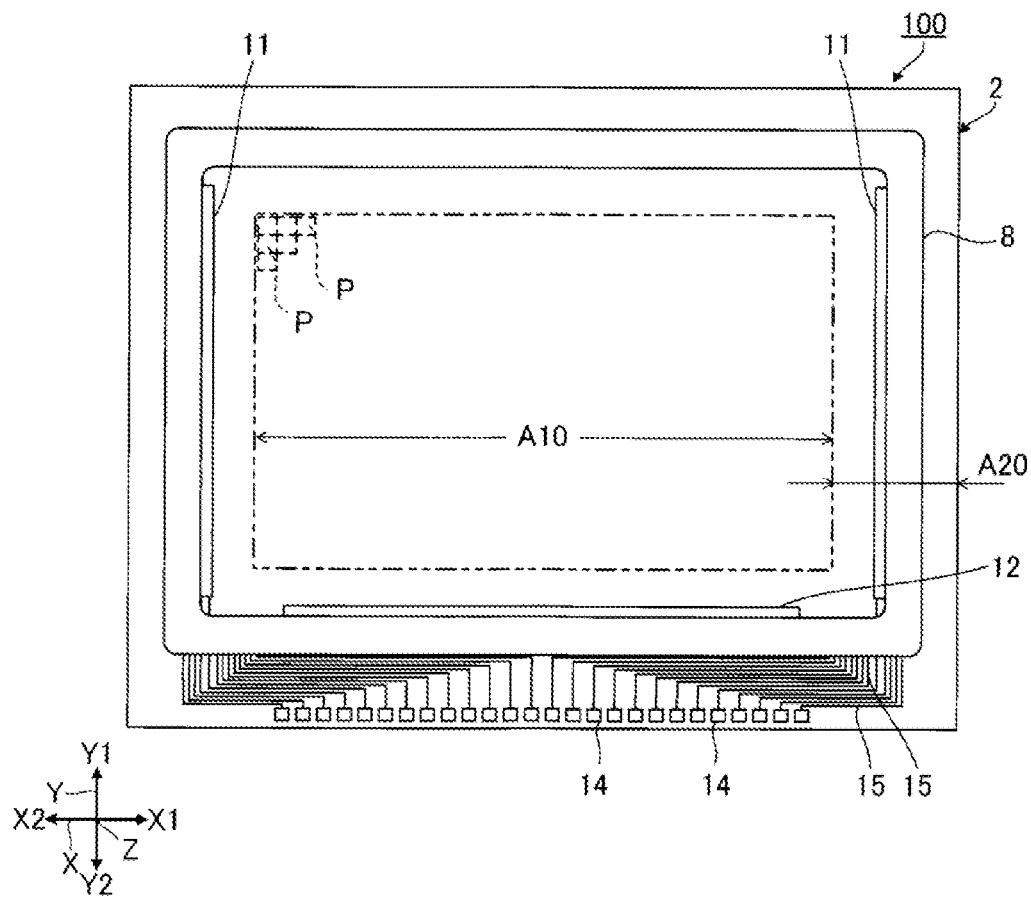
FIG. 1 is a plan view of an electro-optical device according to a preferred embodiment.
Figure 2:
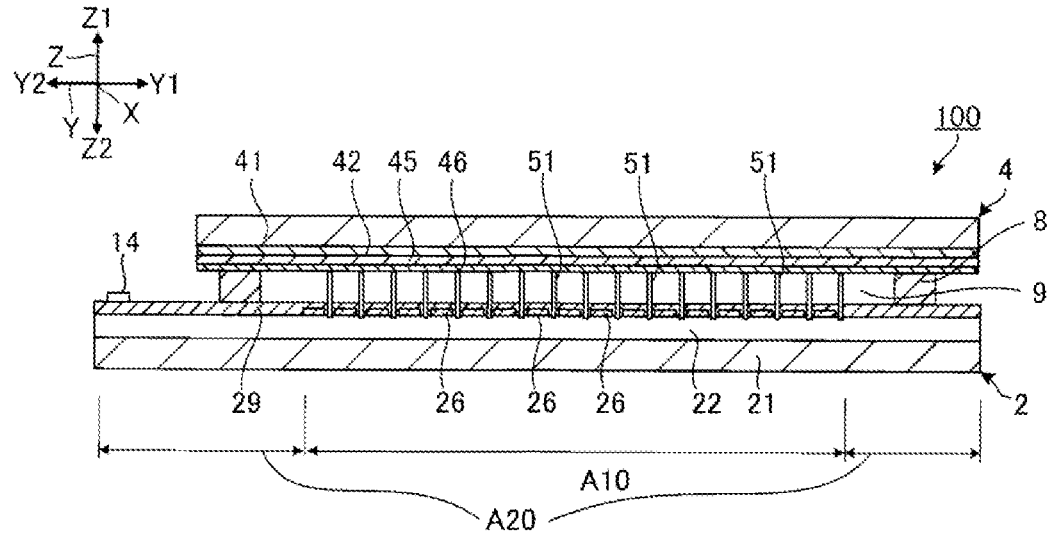
FIG. 2 is a cross-sectional view of an electro-optical device illustrated in FIG. 1.

FIG. 1 is a plan view of an electro-optical device 100 according to a first embodiment. FIG. 2 is a cross-sectional view of the electro-optical device 100 illustrated in FIG. 1. Note that in FIG. 1, the illustration of a counter substrate 4 is omitted. Also, for convenience of explanation, description will be given appropriately using an X axis, a Y axis, and a Z axis orthogonal to one another. In addition, a direction along the X axis is referred to as X1 direction, and a direction opposite to the X1 direction is referred to as X2 direction. Similarly, a direction along the Y axis is referred to as Y1 direction, and a direction opposite to the Y1 direction is referred to as Y2 direction. A direction along the Z axis is referred to as Z1 direction, and a direction opposite to the Z1 direction is referred to as Z2 direction.

The electro-optical device 100 illustrated in FIGS. 1 and 2 serves as a liquid crystal display device of a transmissive type. As illustrated in FIG. 2, the electro-optical device 100 includes an element substrate 2 having translucency, the counter substrate 4 having translucency, a plurality of spacers 51, a seal member 8 of a frame shape, and a liquid crystal layer 9. The element substrate 2 is an example of "first substrate", the counter substrate 4 is an example of "second substrate", and the liquid crystal layer 9 is an example of "electro-optical layer". The seal member 8 is disposed between the element substrate 2 and the counter substrate 4. The liquid crystal layer 9 is disposed inside a region enclosed by the element substrate 2, the counter substrate 4, and the seal member 8. The element substrate 2, the liquid crystal layer 9, and the counter substrate 4 are aligned along the Z axis. In the following, viewing in the Z1 direction or Z2 direction is referred to as "plan view".

In the electro-optical device 100 of the first embodiment, light is incident, for example, on the element substrate 2, and passes through the liquid crystal layer 9 to be emitted from the counter substrate 4. Note that the light may be incident on the counter substrate 4, and passes through the liquid crystal layer 9 to be emitted from the element substrate 2. The light serves as visible light. The term "translucency" refers to transmittivity to visible light, and means that a transmittance of the visible light may be not less than 50%. Further, the electro-optical device 100 illustrated in FIG. 1 has a quadrilateral shape when viewed in plan view, and a planar shape of the electro-optical device 100 may be, for example, a round shape and the like without being limited to the quadrilateral shape.

As illustrated in FIG. 2, the element substrate 2 includes a first base member 21, a layered body 22, a plurality of pixel electrodes 26, and a first alignment film 29. A thickness direction, that is, a layering direction of the layered body 22 is identical to the Z1 direction or the Z2 direction. A surface of the first base member 21 included in the element substrate 2 is parallel to an X-Y plane. The first base member 21 is constituted by a plate having translucency and insulating properties. The first base member 21 is formed of a material such as glass or quartz, for example. The layered body 22 has translucency and insulating properties. Note that, although not illustrated in FIG. 2, a plurality of wirings and the like are arranged at the layered body 22. Each of the pixel electrodes 26 has translucency. In addition, each of the pixel electrodes 26 is formed of a transparent conductive material such as Indium Tin Oxide (ITO) or Indium Zinc Oxide (IZO), for example. In addition, although not illustrated, the element substrate 2 may have a plurality of dummy pixel electrodes arranged in a manner enclosing the plurality of pixel electrodes 26 when viewed in plan view. Each of the dummy pixel electrodes serves as an electrode that does not contribute to an image display. Further, the first alignment film 29 is located closest to the liquid crystal layer 9 in the element substrate 2, and allows liquid crystal molecules of the liquid crystal layer 9 to be aligned. The first alignment film 29 is formed of a material such as polyimide and silicon oxide, for example.

As illustrated in FIG. 2, the plurality of spacers 51 are arranged between the layered body 22 and the counter substrate 4. Note that each of the spacers 51 and the element substrate 2 will be described later.

As illustrated in FIG. 2, the counter substrate 4 includes a second base body 41, an insulating film 42, a common electrode 45, and a second alignment film 46. The second base body 41, the insulating film 42, the common electrode 45, and the second alignment film 46 are aligned in this order. The second alignment film 46 is located closest to the liquid crystal layer 9. Each of the insulating film 42, the common electrode 45, and the second alignment film 46 overlaps in plan view with substantially the entire region of the second base body 41. The second base body 41 is constituted by a plate having translucency and insulating properties. The second base body 41 is formed of a material such as glass or quartz, for example. The insulating film 42 is formed of a silicon based inorganic material having translucency and insulating properties such as silicon oxide, for example. The common electrode 45 is electrically coupled, via a non-illustrated conduction electrode, to the element substrate 2. A fixed potential is applied to the common electrode 45, for example. The common electrode 45 is formed of a transparent conductive material such as ITO or IZO, for example. The second alignment film 46 allows the liquid crystal molecules of the liquid crystal layer 9 to be aligned. The second alignment film 46 is formed of a material such as polyimide and silicon oxide, for example.

The seal member 8 is formed using an adhesive containing various types of curable resins such as epoxy resin, for example. The seal member 8 is affixed to each of the element substrate 2 and the counter substrate 4.

The liquid crystal layer 9 includes the liquid crystal molecules having positive or negative dielectric anisotropy. The liquid crystal layer 9 is interposed between the element substrate 2 and the counter substrate 4 in such a manner that the liquid crystal molecules are in contact with both the first alignment film 29 and the second alignment film 46. The liquid crystal layer 9 is disposed between the plurality of pixel electrodes 26 and the common electrode 45, where the optical characteristics vary depending on an electric field. Specifically, an alignment of the liquid crystal molecules included in the liquid crystal layer 9 varies depending on a voltage applied to the liquid crystal layer 9.

As illustrated in FIG. 1, the element substrate 2 includes a plurality of scanning line driving circuits 11, a data line driving circuit 12, a plurality of external terminals 14, and a plurality of leading wirings 15. Each of the plurality of leading wirings 15 is coupled to any one of the plurality of external terminals 14. Each of the external terminals 14 is coupled to a non-illustrated wiring substrate. Various signals are input to the element substrate 2 via the wiring substrate. Each of the plurality of leading wirings 15 is also coupled to the scanning line driving circuit 11 or the data line driving circuit 12.

The electro-optical device 100 configured as above has a display region A10 for displaying images, and a peripheral region enclosing the display region A10 when viewed in plan view. The display region A10 includes a plurality of pixels P arrayed in a matrix pattern. The plurality of pixels P are arranged in a one-to-one correspondence with the plurality of pixel electrodes 26. In the peripheral region A20, the scanning line driving circuit 11, the data line driving circuit 12, and the like are arranged.

1B. Electrical Configuration

Figure 3:
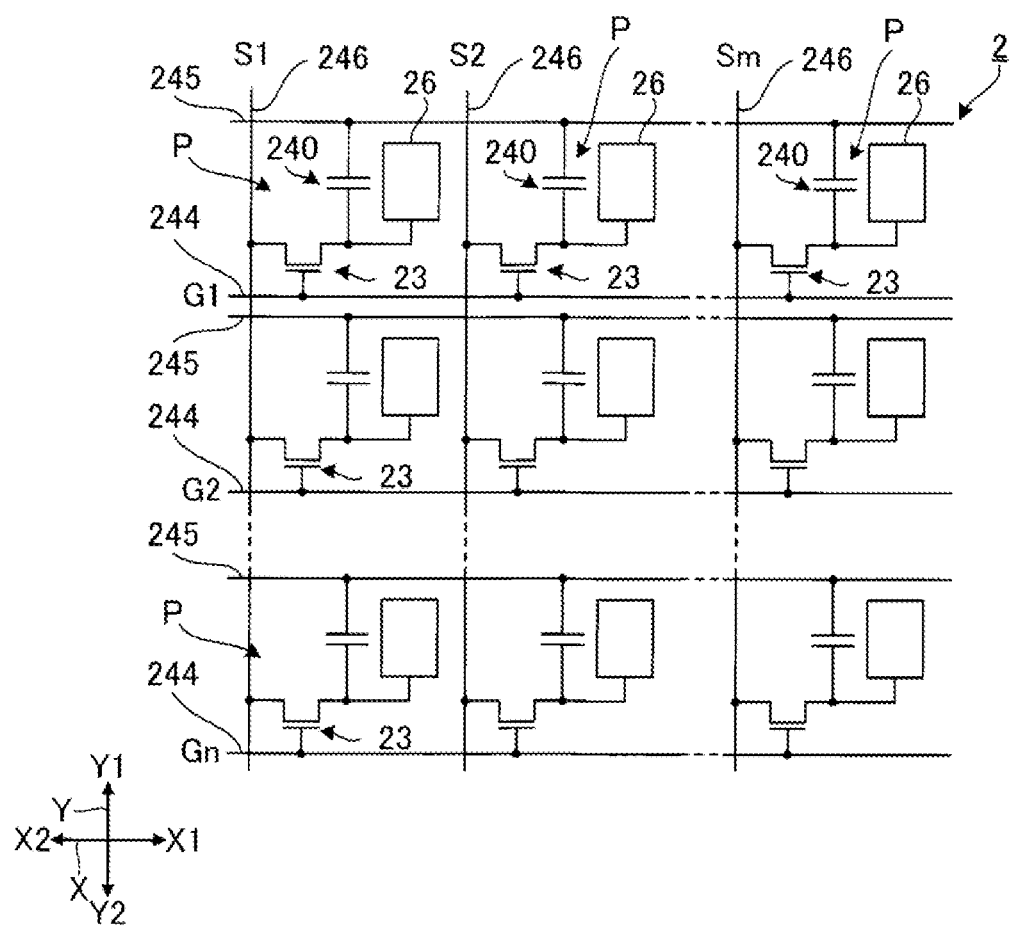
FIG. 3 is an equivalent circuit diagram illustrating an electrical configuration of an element substrate.

FIG. 3 is an equivalent circuit diagram illustrating an electrical configuration of an element substrate. As illustrated in FIG. 3, the element substrate 2 includes a plurality of transistors 23, n pieces of scanning lines 244, m pieces of data lines 246, n pieces of capacitor lines 245, and a plurality of storage capacitors 240. These components are arranged at the layered body 22 in FIG. 2. Note that each of the n and m is an integer of 2 or greater. Also, the plurality of transistors 23 are arranged in a one-to-one correspondence with the plurality of pixel electrodes 26. Each of the transistors 23 is a TFT that functions as a switching element, for example. Each of the transistors 23 includes a gate, a source, and a drain.

Each of the n pieces of scanning lines 244 extends along the X axis, and the n pieces of scanning lines 244 are arranged at equal intervals along the Y axis. Each of the n pieces of scanning lines 244 is electrically coupled to each of the gates of some transistors 23 among all of the transistors 23. The n pieces of scanning lines 244 are also electrically coupled to the scanning line driving circuit 11 illustrated in FIG. 1. To one to the n pieces of scanning lines 244, scanning signals G1, G2, . . . , and Gn are line-sequentially supplied from the scanning line driving circuit 11.

Each of the m pieces of data lines 246 illustrated in FIG. 3 extends along the Y axis, and the m pieces of data lines 246 are arranged at equal intervals along the X axis. Each of the m pieces of data lines 246 is electrically coupled to each of the sources of some transistors 23 among all of the transistors 23. The m pieces of data lines 246 are also electrically coupled to the data line driving circuit 12 illustrated in FIG. 1. To one to the m pieces of data lines 246, image signals S1, S2, . . . , and Sm are line-sequentially supplied from the data line driving circuit 12.

The n pieces of scanning lines 244 and the m pieces of data lines 246 that are illustrated in FIG. 3 are insulated from each other, and are formed in a lattice-like pattern when viewed in plan view. A region enclosed by the respective two adjacent scanning lines 244 and the respective two adjacent data lines 246 corresponds to the pixel P. Each of the pixel electrodes 26 is electrically coupled with the drain of the transistor 23 corresponding to the pixel electrode 26.

Each of the n pieces of capacitor lines 245 extends along the X axis, and the n pieces of capacitor lines 245 are arranged at equal intervals along the Y axis. The n pieces of capacitor lines 245 are also insulated from the m pieces of data lines 246 and the n pieces of scanning lines 244, and are formed spaced apart from these lines. A fixed potential such as a ground potential is applied to each of the capacitor lines 245, for example. Each of the n pieces of capacitor lines 245 is also electrically coupled to some storage capacitors 240 among all of the storage capacitors 240. The plurality of storage capacitors 240 are electrically coupled in a one-to-one correspondence to the plurality of pixel electrodes 26. The plurality of storage capacitors 240 are also electrically coupled in a one-to-one correspondence to the drains of the plurality of transistors 23. Each of the storage capacitors 240 is a capacitive element for holding a potential of the pixel electrode 26.

The scanning signals G1, G2, . . . , and Gn become sequentially active to sequentially select the n pieces of scanning lines 244, then, the transistor 23 coupled to the selected scanning line 244 becomes ON-state. Then, the image signals S1, S2, . . . , and Sm having magnitudes commensurate with a grayscale to be displayed are transmitted, via the m pieces of data lines 246, to the pixel P corresponding to the selected scanning line 244, to then be applied to the pixel electrode 26. This allows a voltage in accordance with the grayscale to be displayed to be applied to a liquid crystal capacitor formed between each of the pixel electrodes 26 and the common electrode 45 included in the counter substrate 4 illustrated in FIG. 2, where the alignment of the liquid crystal molecules varies depending on the applied voltage. In addition, the applied voltage is held by the storage capacitor 240. Such a variation in the alignment of the liquid crystal molecules allows light to be modulated, to thus enable grayscale display.

1C. Element Substrate 2

Figure 4:
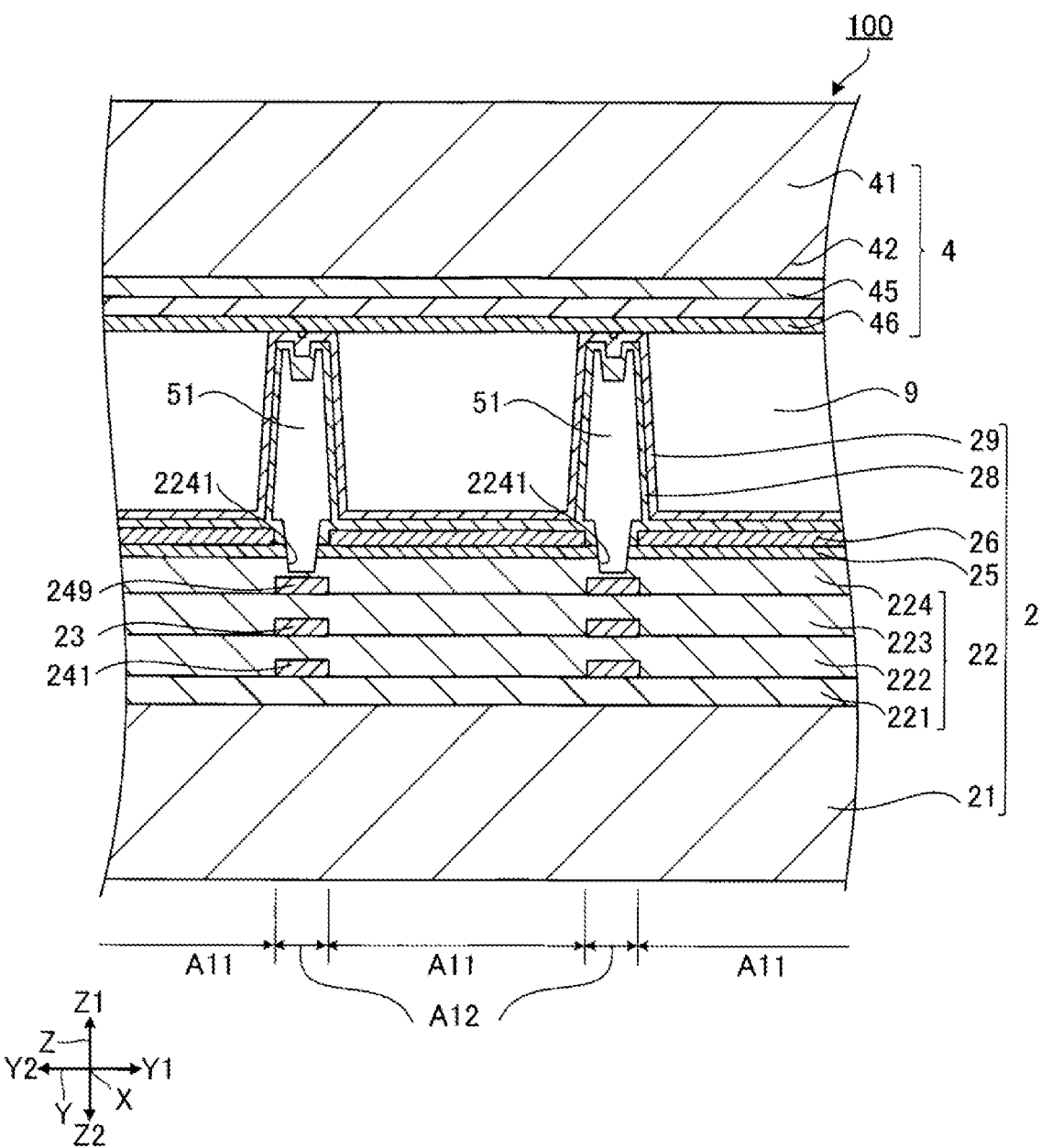
FIG. 4 is a cross-sectional view illustrating a part of the electro-optical device.

FIG. 4 is a cross-sectional view illustrating a part of the electro-optical device 100. As illustrated in FIG. 4, the element substrate 2 includes the first base member 21, the layered body 22, a hygroscopic film 25, the plurality of pixel electrodes 26, a coat layer 28, and the first alignment film 29. The layered body 22, the hygroscopic film 25, the plurality of pixel electrodes 26, the coat layer 28, and the first alignment film 29 are layered in this order from the first base member 21. In addition, the plurality of spacers 51 are arranged between the layered body 22 and the coat layer 28. Further, although not illustrated in FIG. 4, the element substrate 2 includes a plurality of protection portions 30. The plurality of protection portions 30 will be described later with reference to FIG. 6. Note that in the following, description will be given with the Z1 direction being upward and the Z2 direction being downward.

As illustrated in FIG. 4, the layered body 22 is disposed on the first base member 21. The layered body 22 includes a plurality of insulating layers 221, 222, 223, and 224. The insulating layers 221, 222, 223, and 224 are layered in this order from the first base member 21 toward the plurality of pixel electrodes 26. Note that the number of the layers included in the layered body 22 is arbitrarily determined without being limited to four. For example, the number of the layers is appropriately set in accordance with an arrangement of various types of wirings.

A plurality of light-shielding portions 241, the plurality of transistors 23, and a plurality of relay electrodes 249 are arranged at the layered body 22. Note that in FIG. 4, each of the light-shielding portions 241, each of the transistors 23, and each of the relay electrodes 249 are schematically illustrated. Also, although not illustrated in FIG. 4, the wirings illustrated in FIG. 3 and the like are arranged at the layered body 22. Specifically, a plurality of scanning lines 244, a plurality of capacitor lines 245, a plurality of data lines 246, and the plurality of storage capacitors 240 that are described above are arranged at the layered body 22.

As illustrated in FIG. 4, the plurality of light-shielding portions 241 are arranged between the insulating layer 221 and the insulating layer 222. The plurality of light-shielding portions 241 are arranged in a one-to-one correspondence with the plurality of transistors 23. Each of the light-shielding portions 241 blocks light from entering the transistor 23 corresponding to the light-shielding portion 241. Each of the light-shielding portions 241 is formed of a material including, but not particularly limited to, a metal such as tungsten, for example. Note that the plurality of light-shielding portions 241 may be arranged at the first base member 21. Also, the plurality of light-shielding portions 241 may be omitted.

The plurality of transistors 23 are arranged between the insulating layer 222 and the insulating layer 223. Although not illustrated, each of the transistors 23 includes a semiconductor layer, a gate electrode, and a gate insulating layer. The semiconductor layer has a source region, a drain region, and a channel region. The semiconductor layer is formed of polysilicon, for example. In a region excluding the channel region of the semiconductor layer is doped with impurities that increase conductivity. In addition, the gate electrode is formed by doping the impurities that increase conductivity in the polysilicon, for example. The gate electrode may be formed of a material having conductivity such as a metal, a metal silicide, a metal compound, or the like.

The plurality of relay electrodes 249 are arranged between the insulating layer 223 and the insulating layer 224. The plurality of relay electrodes 249 are arranged in a one-to-one correspondence with the plurality of transistors 23. Each of the relay electrodes 249 is electrically coupled to the drain of the corresponding transistor 23. The plurality of relay electrodes 249 are also arranged in a one-to-one correspondence with the plurality of pixel electrodes 26. Each of the relay electrodes 249 is configured to electrically relay the transistor 23 with the pixel electrode 26. In addition, the insulating layer 224 has a plurality of first concave portions 2241. The spacer 51 is disposed on each of the first concave portions 2241.

Each of the relay electrodes 249 is formed of a material such as a metal, a metal nitride, or a metal silicide, for example. Examples of the metal include tungsten (W), titanium (Ti), chromium (Cr), iron (Fe), aluminum (Al), and the like. In addition, each of the wirings not illustrated in FIG. 4 is also formed of the material such as a metal, a metal nitride, or a metal silicide, for example. In particular, the relay electrode 249, which contains the aluminum, helps reduce a resistance of the wiring. Further, although not illustrated, an arrangement of the wirings disposed at the layered body 22 is arbitrarily determined. For example, the wirings may be disposed above the transistor 23, or the wirings may be disposed below the transistor 23.

Each of the insulating layers 221 to 224 is formed of an inorganic material including silicon such as silicon oxynitride and silicon nitride, for example. Each of the insulating layers 221 to 224, which is formed of the inorganic material, has excellent optical properties, facilitating a formation of a layer having a sufficiently thin thickness, compared to when being formed of a resin material. The insulating layers 221 to 224 may also be composed of the same material as one another, or may be composed of a different material from one another. However, the insulating layers 221 to 224, which are composed of the same material as one another, facilitate a formation of the layered body 22, as well as suppresses the occurrence of interfacial reflection.

As illustrated in FIG. 4, the hygroscopic film 25 is disposed on the layered body 22. The hygroscopic film 25 has hygroscopicity and adsorbs moisture entrained in the liquid crystal layer 9. The hygroscopic film 25 is composed of an inorganic material having translucency and hygroscopicity such as Borosilicate Glass (BSG), for example. Note that the hygroscopic film 25 may be appropriately omitted.

The plurality of pixel electrodes 26 are arranged on the hygroscopic film 25. The coat layer 28 having translucency and insulating properties is disposed on the plurality of pixel electrodes 26. The coat layer 28 is in contact with the plurality of pixel electrodes 26. The coat layer 28 also covers the plurality of spacers 51. The coat layer 28 is formed of the inorganic material including silicon such as silicon oxide and silicon oxynitride, for example. Note that the coat layer 28 may be appropriately omitted.

The first alignment film 29 is disposed on the coat layer 28. The first alignment film 29 is in contact with the coat layer 28. The coat layer 28, which is disposed at a lower layer of the first alignment film 29, helps suppress the pixel electrode 26 from being partially uncovered by the first alignment film 29. Thus, the presence of the coat layer 28 enables to enhance uniformity of the first alignment film 29.

In the first embodiment, a part of the first alignment film 29 located on each of the spacers 51 is in contact with the counter substrate 4. Note that it is sufficient for the coat layer 28 and the first alignment film 29 to be at least disposed on the plurality of pixel electrodes 26. Thus, the coat layer 28 and the first alignment film 29 may not cover each of the spacers 51. In this case, each of the spacers 51 may make direct contact with the counter substrate 4.

Figure 5:
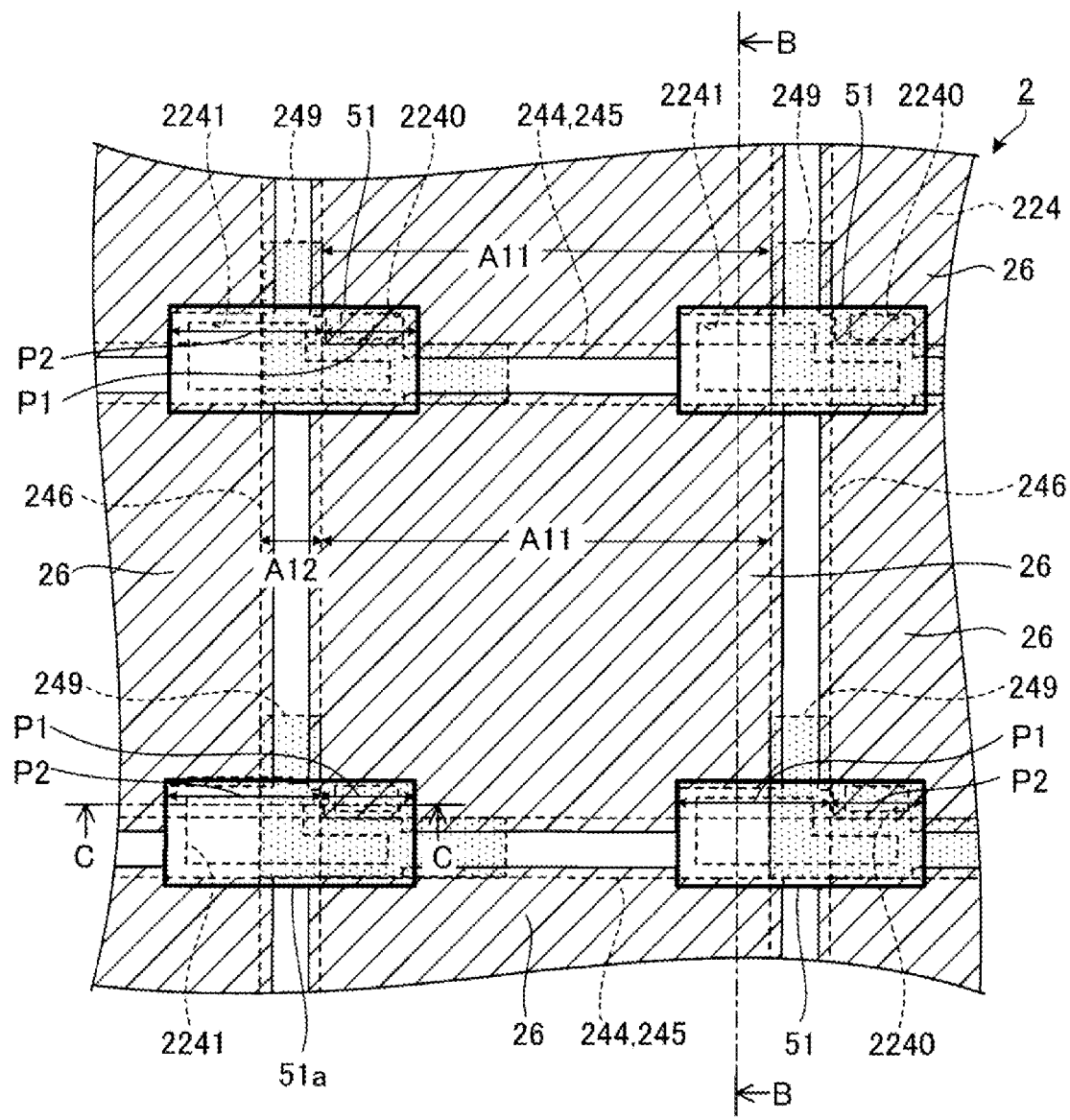
FIG. 5 is a plan view illustrating a part of an element substrate.

FIG. 5 is a plan view illustrating a part of the element substrate 2. FIG. 4 corresponds to a cross section taken along a line B-B in FIG. 5. Note that, for convenience of explanation, each of the relay electrodes 249 is marked with a dot pattern. Each of the pixel electrodes 26 is marked with a hatched pattern. Also, in FIG. 5, illustration of the coat layer 28 and the first alignment film 29 are omitted.

As illustrated in FIGS. 4 and 5, the element substrate 2 has a plurality of light-transmissive regions A11 through which light passes, and a wiring region A12 for blocking light. The plurality of light-transmissive regions A11 are arrayed in a matrix pattern. Each of the plurality of light-transmissive regions A11 has a substantially quadrilateral shape when viewed in plan view. Each of the light-transmissive regions A11 is provided with the pixel electrode 26. Each of the light-transmissive regions A11 includes a region that contributes to the image display. The wiring region A12 is formed in a lattice-like pattern when viewed in plan view, and encloses the light-transmissive regions A11. The wiring region A12 is provided with the plurality of relay electrodes 249, the plurality of scanning lines 244, the plurality of data lines 246, and the plurality of capacitor lines 245 that are described above. In addition, although not illustrated in the figure, in the wiring region A12, the plurality of transistors 23 and the plurality of storage capacitors 240 that are described above are arranged.

1D. Configuration of Spacer 51 and Vicinity Thereof

As illustrated in FIGS. 4 and 5, the plurality of spacers 51 are arranged in a one-to-one correspondence with the plurality of relay electrodes 249. The plurality of spacers 51 are also arranged in a one-to-one correspondence with the plurality of pixel electrodes 26. For example, as illustrated in FIG. 5, a spacer 51a, which is one piece of the spacer 51 that is arbitrarily selected from among the plurality of spacers 51, is disposed corresponding to the pixel electrode 26 located diagonally upward right in FIG. 5 with respect to the spacer 51a. The spacer 51a also corresponds to the relay electrode 249 overlapping in plan view with the spacer 51a.

As illustrated in FIG. 4, each of the spacers 51 has a columnar shape and protrudes along the Z1 direction from the element substrate 2 toward the counter substrate 4. Each of the spacers 51 defines a distance between the element substrate 2 and the counter substrate 4. Specifically, each of the spacers 51 defines a distance between the corresponding pixel electrode 26 and the common electrode 45. From another perspective, each of the spacers 51 defines the thickness of the liquid crystal layer 9. As described above, the spacer 51 is also disposed for each of the pixel electrodes 26. This makes it possible to reduce, for each of the pixels P, a variation in the distance between the element substrate 2 and the counter substrate 4. This also makes it possible to reduce a difference in the distance between the respective plurality of pixels P.

Each of the spacers 51 may be formed of, but not particularly limited to, an inorganic material. In other words, it is preferred for each of the spacers 51 to be essentially free of a resin material. Each of the spacers 51, which is essentially free of the resin material, helps avoid a possibility of entry of a resin component into the liquid crystal layer 9. This makes it possible to prevent a failure such as an improper operation due to an organic contamination. Also, each of the spacers 51, which is composed of the inorganic material, can be enhanced in dimensional accuracy, preventing dimensional change over time compared to when being composed of an organic material. This makes it possible to stabilize the distance between the element substrate 2 and the counter substrate 4 over a long period of time.

The inorganic material composing each of the spacers 51 may include, but not particularly limited to, silicon oxide or silicon oxynitride, for example. The spacer 51, which contains the silicon nitride and silicon oxynitride, can be manufactured with high dimensional accuracy by dry etching, for example. Note that the manufacturing method will be described later. Also, each of the spacers 51, which contains the silicon oxide among the inorganic materials, can be manufactured particularly easily and with high dimensional accuracy.

Note that each of the spacers 51 may be formed of a plurality of layers. In this case, the plurality of layers may contain mutually different material or may contain the same material as one another. Thus, each of the spacers 51 may contain a plurality of types of inorganic materials. Each of the spacers 51 may also contain a resin material.

As illustrated in FIG. 5, each of the spacers 51 has a quadrangular shape when viewed in plan view. Note that the shape may be a polygonal shape other than the quadrilateral shape or a circular shape, for example. Also, each of the spacers 51 illustrated in FIG. 5 has the quadrilateral shape having a longitudinal direction in the direction along the X axis and may also have a quadrilateral shape having a longitudinal direction in the direction along the Y axis, when viewed in plan view.

Each of the spacers 51 also overlaps with an intersecting portion between the scanning line 244 and the data line 246, when viewed in plan view. In addition, each of the spacers 51 partially overlaps in plan view with the corresponding relay electrode 249. Further, the plurality of spacers 51 are arranged in a one-to-one correspondence with the plurality of first concave portions 2241. Each of the first concave portions 2241 avoids overlapping with the pixel electrode 26 and overlaps with the various types of wirings, when viewed in plan view. That is, the first concave portion 2241 is formed at a part that does not contribute to the image display. Each of the first concave portions 2241 also avoids overlapping with an outer edge of the spacer 51 corresponding to the first concave portion 2241 and overlaps with a center of the spacer 51, when viewed in plan view.

Further, each of the spacers 51 partially overlaps in plan view with the corresponding pixel electrode 26. Specifically, each of the spacers 51 has a first portion P1 overlapping with the corresponding pixel electrode 26 and a second portion P2 not overlapping with the pixel electrode 26, when viewed in plan view. For example, the spacer 51a has the first portion P1 overlapping with the pixel electrode 26 located diagonally upward right in FIG. 5 with respect to the spacer 51a, and the second portion P2 not overlapping with the pixel electrode 26. The second portion P2 overlaps in plan view with the wiring.

The spacer 51a, which has the first portion P1 and the second portion P2, can be expanded in the arrangement area without enlarging an area where the spacer 51a overlaps in plan view with the pixel electrode 26, compared to when being constituted only by the first portion P1. The arrangement area being expanded improves a stability of the spacer 51a. The spacer 51a also improves an adhesiveness to the element substrate 2. This makes it possible to increase the adhesiveness between the spacer 51a and the element substrate 2 while suppressing a decrease in the opening ratio. This allows the spacer 51a to be suppressed from being peeled off from the element substrate 2, to thus cause the spacer 51a to improve a stability of the distance between the element substrate 2 and the counter substrate 4.

Note that all of the spacers 51 may not have the first portion P1 and the second portion P2. However, it is preferred for all of the spacers 51 to have the first portion P1 and the second portion P2. This makes it possible to particularly improve the stability of the distance between the element substrate 2 and the counter substrate 4. This also makes it possible to suppress the occurrence of a variation in the stability of the distance for each of the pixels P.

In addition, each of the spacers 51, which has the first portion P1 where the spacer 51 overlaps in plan view with the pixel electrode 26, helps increase a density of the pixel P compared to when not having the first portion P1. In an example illustrated in FIG. 5, each of the spacers 51 overlaps in plan view with four pieces of the pixel electrodes 26. This makes it possible to increase the density of the pixel P in a further efficient manner. This allows the electro-optical device 100 to have higher resolution.

Figure 6:
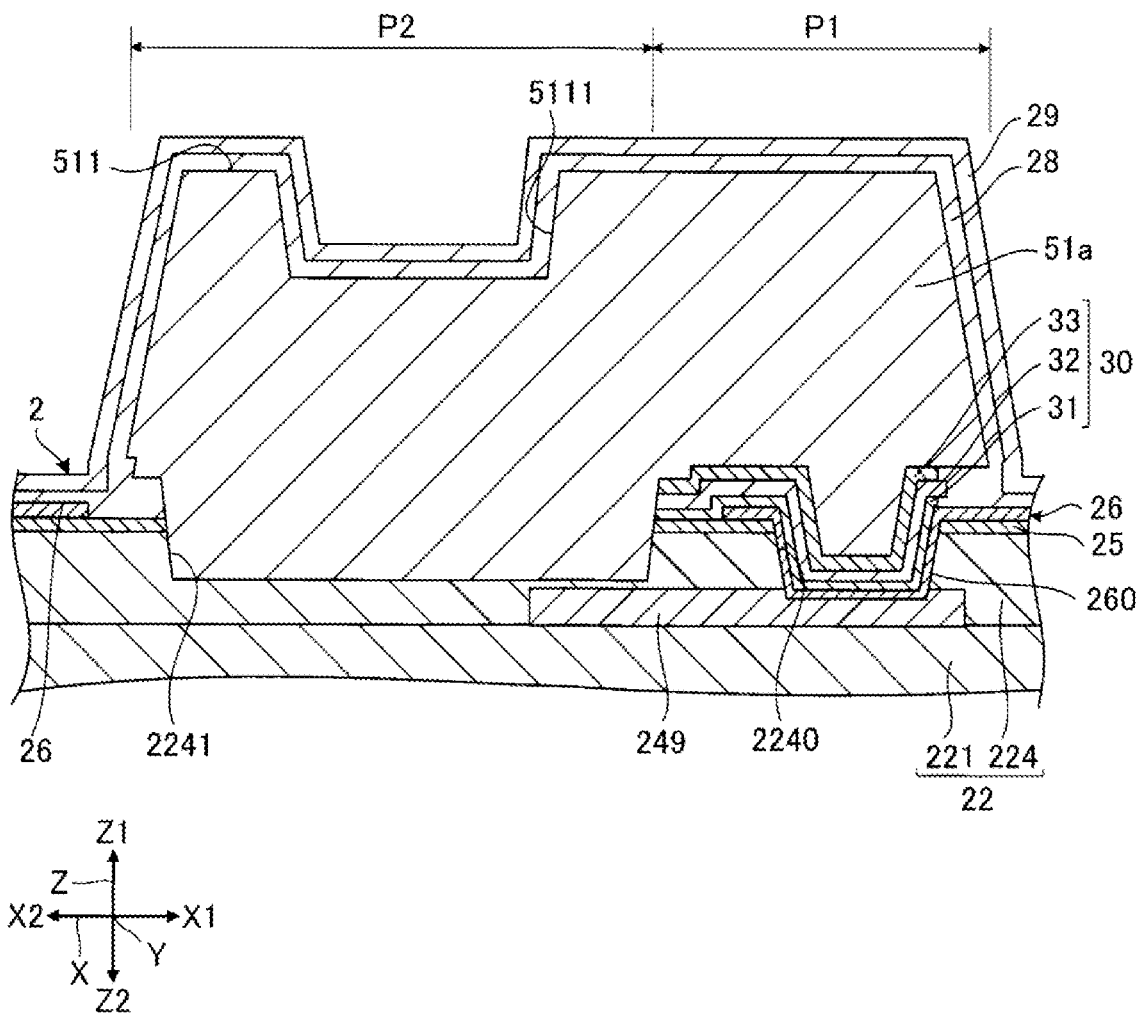
FIG. 6 is a cross-sectional view taken along a line C-C in FIG. 5.

FIG. 6 is a cross-sectional view taken along a line C-C in FIG. 5. In FIG. 6, the spacer 51a that is arbitrarily selected from among the plurality of spacers 51 is illustrated. In the following, description of the spacer 51a and elements associated with the spacer 51a will be given.

As illustrated in FIG. 6, the second portion P2 of the spacer 51a is in contact with the layered body 22. Here, it is preferred for the layered body 22 to contain an inorganic material composing the spacer 51a. The layered body 22, which contains the inorganic material, increases in adhesiveness with respect to the second portion P2 compared to when not containing the inorganic material. This makes it possible to more efficiently suppress the spacer 51a from being peeled off from the element substrate 2.

Specifically, the second portion P2 is in contact with a surface of the first concave portion 2241 of the layered body 22. The second portion P2 is partially disposed inside the first concave portion 2241. That is, the layered body 22 has the first concave portion 2241 at which the spacer 51a is partially disposed. The first concave portion 2241 is a depressed area formed at an upper face of the insulating layer 224. The second portion P2 also passes through the hygroscopic film 25. The second portion P2, which is partially disposed at the first concave portion 2241, helps increase an adhesiveness between the spacer 51a and the layered body 22 compared to when being disposed on a flat surface. In addition, the spacer 51a, which is disposed at the first concave portion 2241, can be stabilized compared to when being disposed on the flat surface. Because of this, the spacer 51a can be more efficiently suppressed from being peeled off from the element substrate 2.

As illustrated in FIG. 6, the second portion P2 has a tip surface 511. The tip surface 511 is a surface that is opposite to a surface of the spacer 51a, which is in contact with the layered body 22. The tip surface 511 has a second concave portion 5111. The second concave portion 5111 is a depressed area that is formed at the tip surface 511. The surface of the second concave portion 5111 is formed in conformance with a shape of a surface of the first concave portion 2241. Thus, although not illustrated, the second concave portion 5111 overlaps in plan view with the first concave portion 2241. The tip surface 511 has a part excluding the second concave portion 5111, which defines the distance between the element substrate 2 and the counter substrate 4. In addition, in the figure, each of the coat layer 28 and the first alignment film 29 is formed along the surface of the second concave portion 5111, but may be formed in a manner filling an inside of the second concave portion 5111. The coat layer 28 and the first alignment film 29, which are formed in a manner filling the inside, can further stabilize the spacer 51a with respect to the counter substrate 4.

As illustrated in FIG. 6, the first portion P1 of the spacer 51a avoids being in contact with the layered body 22, while the second portion P2 of the spacer 51a is being in contact with the layered body 22. Between the first portion P1 and the layered body 22, the hygroscopic film 25, the pixel electrode 26, and the protection portion 30 are arranged. Note that the plurality of protection portions 30 of the element substrate 2 are arranged in a one-to-one correspondence with the plurality of spacers 51. In FIG. 6, among the plurality of protection portions 30, the protection portion 30 corresponding to the spacer 51a is illustrated.

A contact hole 2240 is formed through a part of the layered body 22, which overlaps in plan view with the spacer 51a. Note that the layered body 22 has a plurality of the contact holes 2240, where the plurality of the contact holes 2240 are formed in a one-to-one correspondence with a plurality of the spacers 51a in a one-to-one manner.

The pixel electrode 26 is partially disposed at the contact hole 2240. The contact hole 2240 is a hole that is present at the insulating layer 224. As illustrated in FIG. 6, the pixel electrode 26 has a contact portion 260 disposed along a wall surface that forms the contact hole 2240. The contact portion 260 is coupled to the relay electrode 249. Note that the pixel electrode 26 may be coupled to the relay electrode 249 via a metal plug that fills the contact hole 2240.

The protection portion 30 is disposed on the contact portion 260 of the pixel electrode 26. Thus, the protection portion 30 is disposed between the pixel electrode 26 and the spacer 51a. The protection portion 30 includes a film formed of a material different from the material of the pixel electrode 26 and a material of the spacer 51a. This makes it possible to protect the pixel electrode 26 and the layered body 22 during a manufacture of the spacer 51a, for example. Also, depending on a type of an inorganic material contained in the spacer 51a, there is a risk that the spacer 51a may exert an influence on a crystallinity of the pixel electrode 26 when the spacer 51a is being in contact with the pixel electrode 26. However, the disposition of the protection portion 30 for protecting the pixel electrode 26 enables to suppress the influence that may be exerted.

Specifically, the protection portion 30 includes a metal oxide film 31, an insulating film 32, and a light-shielding film 33. The metal oxide film 31, the insulating film 32, and the light-shielding film 33 are arranged in this order from the pixel electrode 26.

The metal oxide film 31 is formed of a material different from the inorganic material composing the spacer 51a and the material of the pixel electrode 26. The presence of the metal oxide film 31 thus formed enables to protect the pixel electrode 26 during the manufacture of the spacer 51a. This makes it possible to suppress a damage to the pixel electrode 26 during the manufacture.

Specifically, the material of the metal oxide film 31 includes aluminum oxide ($Al_2O_3$) or hafnium oxide ($HfO_2$), for example. The metal oxide film 31, which is composed of the material describe above, provides more efficient protection of the pixel electrode 26 during the manufacture of the spacer 51a, than when being composed of another material. In particular, when the pixel electrode 26 is formed of a transparent conductive material such as ITO, and the spacer 51a is formed of a material of silicon oxide or silicon oxynitride, the metal oxide film 31 can particularly suitably protect the pixel electrode 26.

The insulating film 32 is disposed on the metal oxide film 31. It is preferred for the insulating film 32 to contain silicon oxide such as silicon dioxide, or silicon oxynitride, and more preferred to be composed of silicon oxide.

The light-shielding film 33 having light-shielding properties is disposed on the insulating film 32. Thus, the protection portion 30 includes the light-shielding film 33 having light-shielding properties. The light-shielding film 33 is formed of a material different from the inorganic material composing the spacer 51a, and the material of the pixel electrode 26. The presence of the light-shielding film 33 thus formed prevents the spacer 51a from functioning as a light-guiding path when the spacer 51a has translucency. This makes it possible to suppress light at a pixel P from entering into another pixel P to cause a reduction in contrast. Note that in this specification, the term "translucency" refers to transmittivity to visible light, and means that it is preferred for the transmittance of the visible light to be not less than 50%, and is more preferred to be not less than 10%.

Also, the presence of the light-shielding film 33 enables to protect the pixel electrode 26 during the manufacture of the spacer 51a.

The light-shielding film 33 is formed of a material including a metal such as titanium nitride (TiN) or silicon nitride (SiN), for example. The light-shielding film 33, which is composed of such a material, helps suppress the spacer 51a from functioning as a light-guiding path in a particularly efficient manner. Further, the light-shielding film 33, which contains the silicon nitride, leads to a formation of the spacer 51a without using a metal. This makes it possible to suppress a deterioration of the liquid crystal layer 9, which is caused by an entry of the metal into the liquid crystal layer 9. Thus, the life duration of the electro-optical device 100 can be extended.

In addition, the insulating film 32 is disposed between the pixel electrode 26 and the light-shielding film 33, to thus cause the light-shielding film 33 to avoid making contact with the pixel electrode 26. This makes it possible to suppress a change in the crystallinity of the pixel electrode 26 due to an influence from the light-shielding film 33 even if the light-shielding film 33 contains a metal. Further, the metal oxide film 31, the insulating film 32, and the light-shielding film 33 are covered by the coat layer 28 described above. This makes it possible to suppress the deterioration of the liquid crystal layer 9 caused by the entry of the metal into the liquid crystal layer 9 even if the light-shielding film 33 contains a metal. Accordingly, the life duration of the electro-optical device 100 can be extended.

Note that any one of the films constituting the protection portion 30 may be omitted. For example, the metal oxide film 31 may be omitted. Also, the protection portion 30 may include a film in addition to the metal oxide film 31, the insulating film 32, and the light-shielding film 33.

1E. Manufacturing Method for Spacer 51

Figure 7:
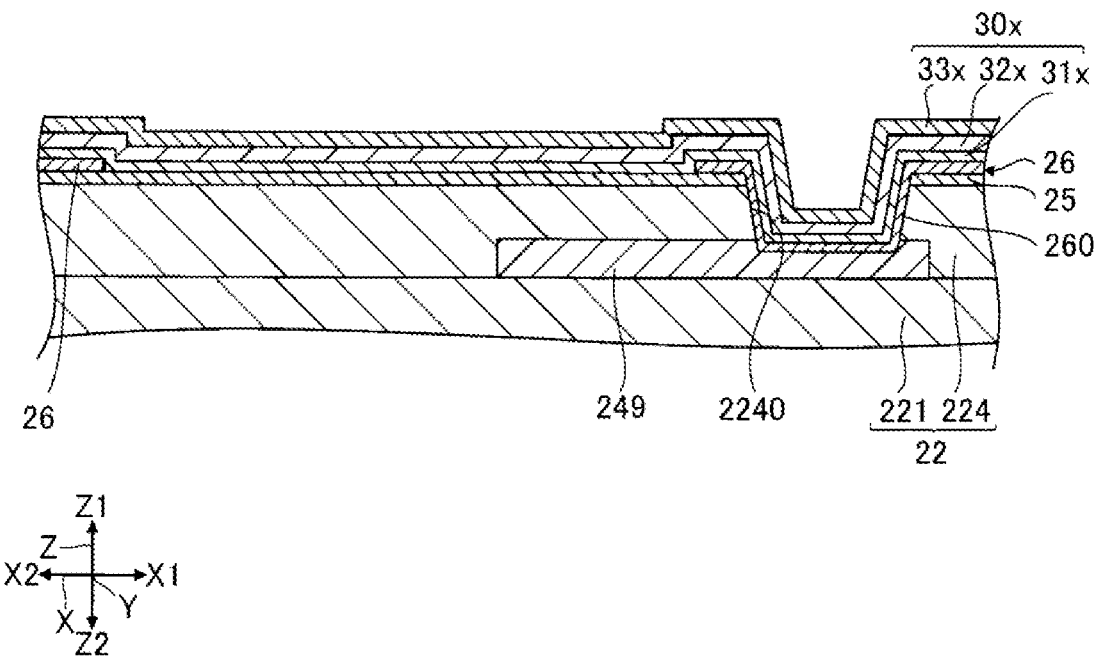

Hereinafter, a manufacturing method for the plurality of spacers 51 and a manufacturing method for elements associated therewith will be described. FIG. 7 is a view for explaining a method for forming a protection layer 30x and the like. Note that description will be given below with the spacer 51a as the representative.

First, as illustrated in FIG. 7, the contact hole 2240 is formed through the layered body 22 by etching, for example. Note that the insulating layers 221 to 224 are each formed by thermal oxidation method, chemical vapor deposition (CVD) method, or the like, for example. Also, each of the relay electrodes 249 and the various types of wirings are formed in such a way that a metal film is formed by a sputtering method or a vapor deposition method, and then an etching using a resist mask is performed on the metal film, for example.

Next, the hygroscopic film 25 is formed on the layered body 22 by CVD method, for example. Subsequently, the plurality of pixel electrodes 26 are formed on the hygroscopic film 25. For example, a layer composed of a transparent electrode material is formed by CVD or PVD method, and the layer is then patterned using a mask. In this way, the plurality of pixel electrodes 26 are formed. Each of the pixel electrodes 26 is partially disposed at the contact hole 2240. This results in a formation of the pixel electrode 26 having the contact portion 260.

Next, a metal oxide film 31x is formed on the plurality of pixel electrodes 26 by CVD method, for example. The metal oxide film 31x undergoes subsequent steps to be formed into a plurality of the metal oxide films 31. The metal oxide film 31x is formed of a material such as aluminum oxide or hafnium oxide, for example. Next, an insulating film 32x is formed by plasma CVD method, for example. The insulating film 32x undergoes subsequent steps to be formed into a plurality of the insulating films 32. The insulating film 32x is formed of a material such as silicon oxide or silicon oxynitride, for example. Next, a light-shielding film 33x is formed on the insulating film 32x by sputtering method or vapor deposition method, for example. The light-shielding film 33x undergoes subsequent steps to be formed into a plurality of the light-shielding films 33. The light-shielding film 33x is formed of a material including a metal such as titanium nitride or silicon nitride, for example. In this way, the protection layer 30x including the metal oxide film 31x, the insulating film 32x, and the light-shielding film 33x are formed.

Figure 8:
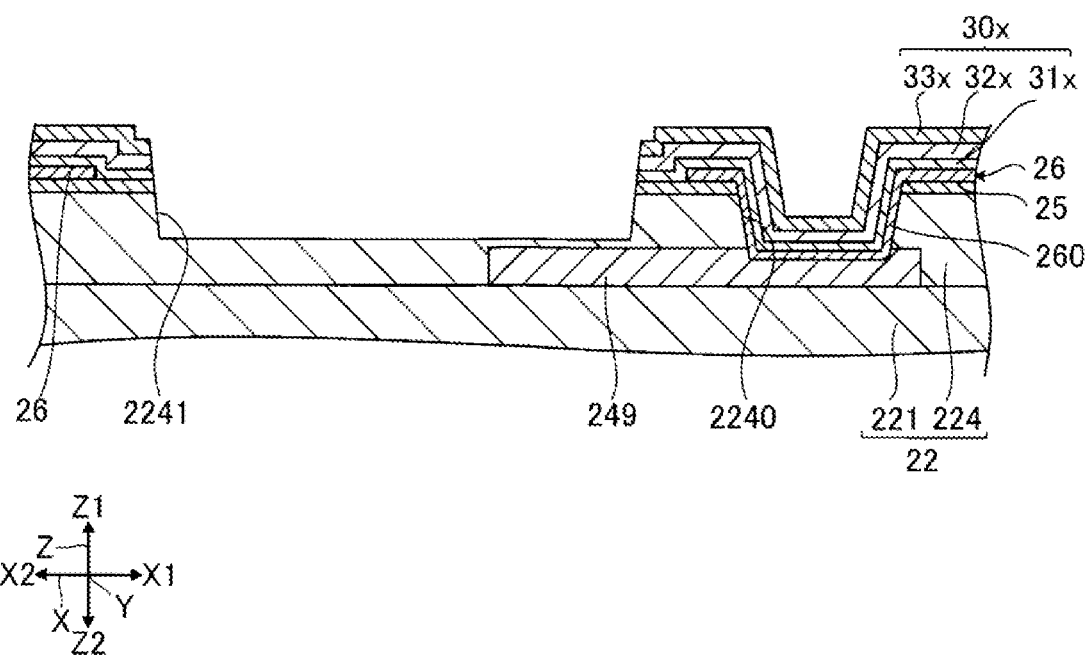
FIG. 8 is a cross-sectional view for explaining a method for forming a first concave portion.

FIG. 8 is a cross-sectional view for explaining a method for forming the first concave portion 2241. Next, as illustrated in FIG. 8, each of the protection layer 30x, the hygroscopic film 25, and the layered body 22 is partially removed by etching using a resist mask, for example. The partial removal causes the first concave portion 2241 to be formed at the layered body 22. In addition, a through hole overlapping in plan view with the first concave portion 2241 is formed through each of the light-shielding film 33x, the insulating film 32x, the metal oxide film 31x, and the hygroscopic film 25.

For example, the partial removal of each of the light-shielding film 33x, the insulating film 32x, the metal oxide film 31x, the hygroscopic film 25, and the layered body 22 is performed in batch or in multiple stages using a single resist mask. The resist mask has an opening in conformance with a shape of the first concave portion 2241 when viewed in plan view, for example. Specifically, for example, each of the light-shielding film 33x, the insulating film 32x, the metal oxide film 31x, the hygroscopic film 25, and the layered body 22 is partially removed by etching using etching gas containing cyclobutane octafluoride ($C_4F_8$), oxygen ($O_2$), and argon (Ar). Note that etching gas other than the etching gas described above is used as appropriate in accordance with each of the materials of the light-shielding film 33x, the insulating film 32x, the metal oxide film 31x, and the hygroscopic film 25.

Note that, in the partial removal of the layered body 22, a wiring disposed at the layered body 22 may be used as the etching stopper.

Figure 9:
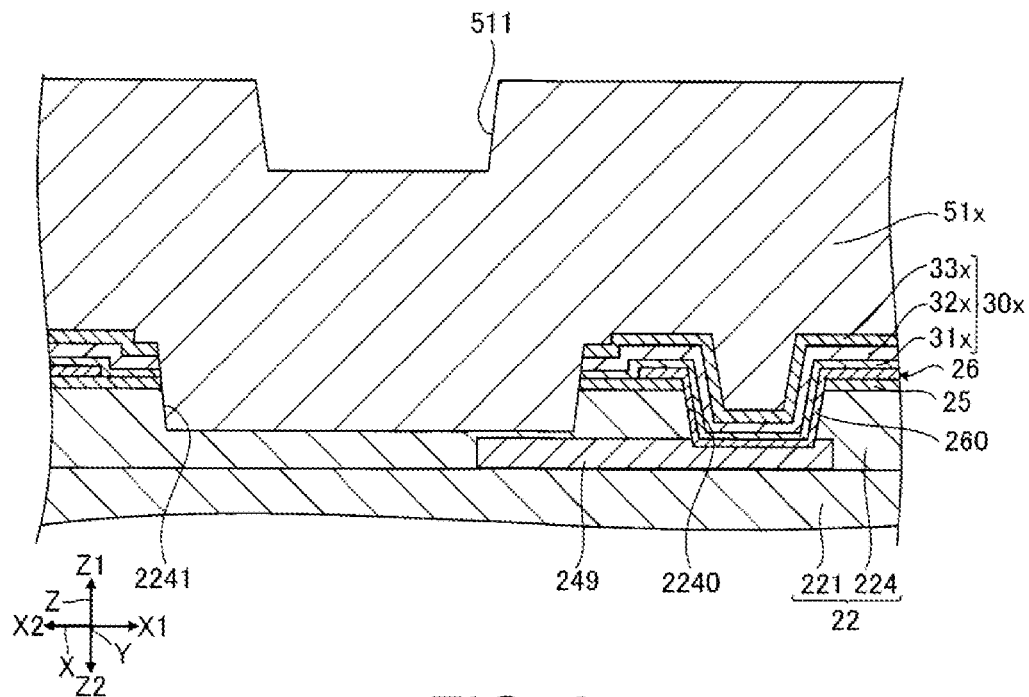
FIG. 9 is a cross-sectional view for explaining a manufacturing method for a spacer.

FIG. 9 is a cross-sectional view for explaining a manufacturing method for the plurality of the spacers 51a. Next, as illustrated in FIG. 9, a material layer 51x containing materials for forming the spacer 51a is formed on the layered body 22 and the protection layer 30x. The material layer 51x is formed into the plurality of spacers 51 through the subsequent steps. For example, the material layer 51x containing an inorganic material is formed by plasma CVD, for example. The material layer 51x is formed in a manner filling insides of the contact hole 2240 and the first concave portion 2241.

Figure 10:
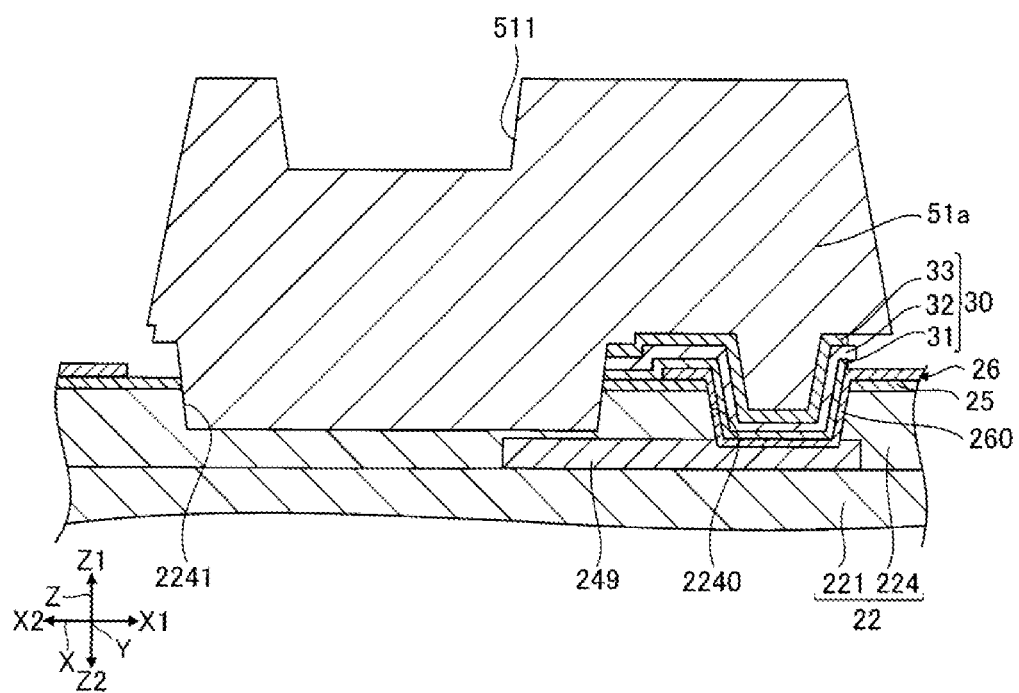
FIG. 10 is a cross-sectional view for explaining a manufacturing method for a spacer.

FIG. 10 is a cross-sectional view for explaining the manufacturing method for the plurality of the spacers 51a. Next, each of the material layer 51x, the light-shielding film 33x, the insulating film 32x, and the metal oxide film 31x is partially removed by etching using a resist mask, for example. The material layer 51x is partially removed to form the plurality of spacers 51 including the spacer 51a illustrated in FIG. 10. In addition, the light-shielding film 33x is partially removed to form the plurality of the light-shielding films 33. The insulating film 32x is partially removed to form the plurality of the insulating films 32. The metal oxide film 31x is partially removed to form the plurality of the metal oxide films 31.

For example, the partial removal of each of the material layer 51x, the light-shielding film 33x, and the insulating film 32x is performed in batch or in multiple stages using a single resist mask. The resist mask has an opening in conformance with a shape excluding the plurality of the spacers 51a, when viewed in plan view, for example.

Specifically, for example, the material layer 51x is partially removed by etching using etching gas containing octafluorinated cyclobutane ($C_4F_8$), oxygen ($O_2$), and argon (Ar), for example. In this removal, the light-shielding film 33x functions as an etching stopper. In addition, for example, each of the light-shielding film 33x and the insulating film 32x is partially removed by chemical dry etching using etching gas containing methane tetrafluoride ($CF_4$) and oxygen ($O_2$), for example. In this removal, the metal oxide film 31x functions as an etch stopper. Further, each of the light-shielding film 33x and the insulating film 32x is partially removed, and then the resist mask is removed. Then, the metal oxide film 31x is partially removed. In this removal, an etchant or the like is used that the etching rate of the material of the layered body 22 is greater than the etching rate of the material of the metal oxide film 31x. Specifically, hydrofluoric acid is used in partially removing the metal oxide film 31x. For example, when the layered body 22 is composed of silicon oxide and the metal oxide film 31x is composed of aluminum oxide, hydrofluoric acid is used to efficiently remove only the metal oxide film 31x.

Further, in the partial removal of each of the material layer 51x, the light-shielding film 33x, the insulating film 32x, and the metal oxide film 31x, the etching proceeds in a vertical direction advancing in the Z2 direction, as well as in a direction intersecting the Z direction. That is, each of a side wall of the light-shielding film 33, a side wall of the insulating film 32, and a side wall of the metal oxide film 31x is removed by side etching. Specifically, a part of the light-shielding film 33 overlapping with an outer edge of the spacer 51a, a part of the insulating film 32 overlapping with the outer edge of the spacer 51a, and a part of the metal oxide film 31x overlapping with the outer edge of the spacer 51a, when viewed in plan view, are removed by the side etching 51a is removed by side etching.

Here, the spacer 51a has the second portion P2 that is in contact with the layered body 22. That is, the light-shielding film 33x, the insulating film 32x, and the metal oxide film 31x are not present in all of the regions between the spacer 51a and the layered body 22. The spacer 51a, which has the second portion P2, becomes less likely to be peeled off from the layered body 22, compared to when not having a part that is in contact with the layered body 22. In particular, the material layer 51x, the light-shielding film 33x, the insulating film 32x, and the metal oxide film 31x, when containing materials that differ from one another, facilitate the side etching to proceed at the mutual interfaces. Accordingly, the spacer 51a, which has the second portion P2, becomes less likely to be peeled off from the layered body 22 even if influenced by the side etching.

By such a method, the spacer 51a composed of an inorganic material can be manufactured in a particularly simple and reliable manner. This makes it possible to particularly efficiently suppress the damage to the pixel electrode 26 during the manufacture of the spacer 51a. This also makes it possible to prevent the spacer 51a from being peeled off from the layered body 22.

Further, although not illustrated, the coat layer 28 is formed in a manner covering the spacer 51a after forming the spacer 51a. The coat layer 28 is formed by Atomic Layer Deposition (ALD) method, for example. In the formation of the coat layer 28, a surface of the pixel electrode 26 is obliquely disposed with respect to a vapor deposition source as appropriate. This makes it possible to suitably form the coat layer 28 on the surface of the pixel electrode 26, as well as on a wall surface of the spacer 51a. The coat layer 28 is formed of an inorganic material including silicon, for example. In particular, the coat layer 28, which is formed of silicon oxide such as silicon dioxide, can be formed in homogeneous and a sufficiently thin thickness by ALD method.

In addition, although not illustrated, the first alignment film 29 is formed by obliquely depositing silicon oxide or the like on the coat layer 28 after forming the coat layer 28. The first alignment film 29, which is formed on the coat layer 28, increases in adhesiveness with respect to the pixel electrode 26 and the spacer 51a compared to when the coat layer 28 is not present. In order to increase the adhesiveness, it is particularly preferred for the coat layer 28 to contain the same material as the material of the first alignment film 29. Note that, in the formation of the first alignment film 29 as well, the surface of the pixel electrode 26 is obliquely disposed with respect to the vapor deposition source as appropriate, as in the formation of the coat layer 28.

2. Modified Examples

The embodiments exemplified above can be variously modified. Specific modification aspects applicable to the embodiments described above are exemplified below. Two or more aspects arbitrarily selected from exemplifications below can be appropriately used in combination unless mutual contradiction arises.

In the embodiments described above, the spacer 51a is in contact with the layered body 22. However, any layer may be interposed between the spacer 51a and the layered body 22. In this case, it is preferred for the layer to contain the same material as the material of the spacer 51a in order to increase the adhesiveness between the spacer 51a and the layered body 22. In addition to the above, it is preferred for the layer to contain the same material as the material of the layered body 22.

In the embodiments described above, the first portion P1 of the spacer 51a is spaced apart from the pixel electrode 26. However, the first portion P1 may make contact with a part of the pixel electrode 26.

In the embodiments described above, the surface of the first concave portion 2241 of the layered body 22 is rendered smooth. However, the surface of the first concave portion 2241 may be a roughened surface. From another perspective, the contact surface of the layered body 22 with the spacer 51a may be a roughened surface. The roughened contact surface enables to further increase the adhesiveness between the layered body 22 and the spacer 51a compared to when the contact surface is rendered smooth.

The plurality of spacers 51 are arranged in a one-to-one correspondence with the plurality of pixel electrodes 26. However, one piece of the spacer 51 may be disposed for two or more pieces of the pixel electrodes 26, for example. Two or more pieces of the spacers 51 may also be arranged for one piece of the pixel electrode 26.

In the embodiments described above, the layered body 22, the plurality of pixel electrodes 26, and the metal oxide film 31 are aligned in this order. However, the layered body 22, the metal oxide film 31, and the plurality of pixel electrodes 26 may be aligned in this order. That is, the metal oxide film 31 may be located between the pixel electrode 26 and the hygroscopic film 25. In this case, it is preferred for the metal oxide film 31 to contain aluminum oxide. The metal oxide film 31, which contains the aluminum oxide, helps reduce a difference between a refractive index of the layered body 22 and a refractive index of the pixel electrode 26. This makes it possible to reduce the interfacial reflection between the layered body 22 and the pixel electrode 26. Specifically, when the layered body 22 is composed of silicon oxide and the pixel electrode 26 is composed of ITO, a refractive index of the metal oxide film 31 is higher than the refractive index of the layered body 22 and is lower than the refractive index of the pixel electrode 26. That is, the refractive indices of the layered body 22, the metal oxide film 31, and the pixel electrode 26 increase in this order. This makes it possible to suppress the interfacial reflection between the layered body 22 and the pixel electrode 26, compared to when the metal oxide film 31 is not provided. Thus, the light utilization efficiency can be suppressed from being reduced. Note that in the embodiment, the hygroscopic film 25 is provided on the layered body 22, where the refractive indices of the hygroscopic film 25, the metal oxide film 31, and the pixel electrode 26 also increase in this order.

In the embodiments described above, a case where the transistor 23 is a TFT has been described as an example, and the transistor 23 may be, without being limited to the TFT, a metal-oxide-semiconductor field-effect transistor (MOSFET), for example.

In the embodiments described above, the electro-optical device 100 of an active matrix scheme is exemplified, and the driving scheme of the electro-optical device may be, without being limited to the active matrix scheme, of a passive matrix scheme or the like, for example.

3. Electronic Apparatus

The electro-optical device 100 can be used for various types of electronic apparatuses.

Figure 11:
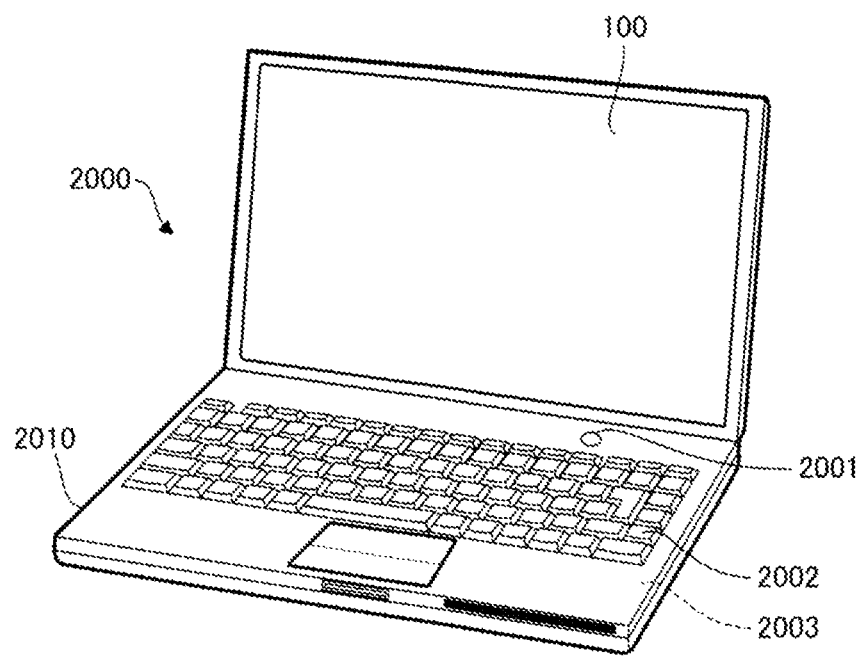
FIG. 11 is a perspective view illustrating a personal computer as an example of an electronic apparatus.

FIG. 11 is a perspective view illustrating a personal computer as an example of an electronic apparatus. A personal computer 2000 includes the electro-optical device 100 configured to display various types of images, a main body unit 2010 at which a power source switch 2001 and a keyboard 2002 are installed, and a control unit 2003. The control unit 2003 includes, for example, a processor and a memory to control operation of the electro-optical device 100.

Figure 12:
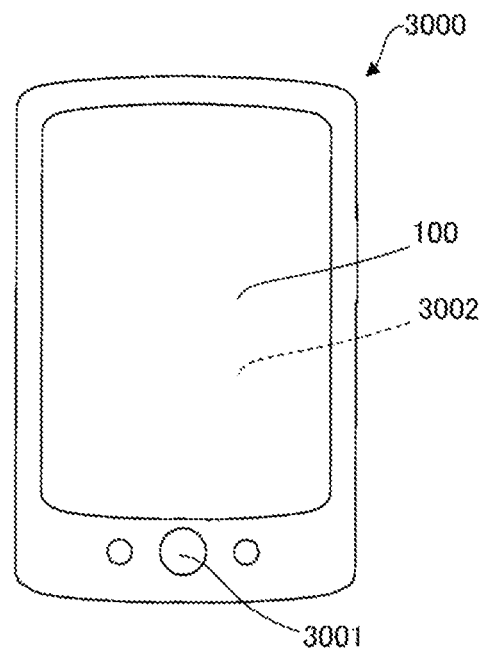
FIG. 12 is a plan view illustrating a smartphone as an example of an electronic apparatus.

FIG. 12 is a plan view illustrating a smartphone 3000 as an example of the electronic apparatus. The smartphone 3000 includes an operation button 3001, the electro-optical device 100 configured to display the various types of images, and a control unit 3002. A screen content displayed on the electro-optical device 100 varies depending on operation of the operation button 3001. The control unit 3002 includes, for example, a processor and a memory to control the operation of the electro-optical device 100.

Figure 13:
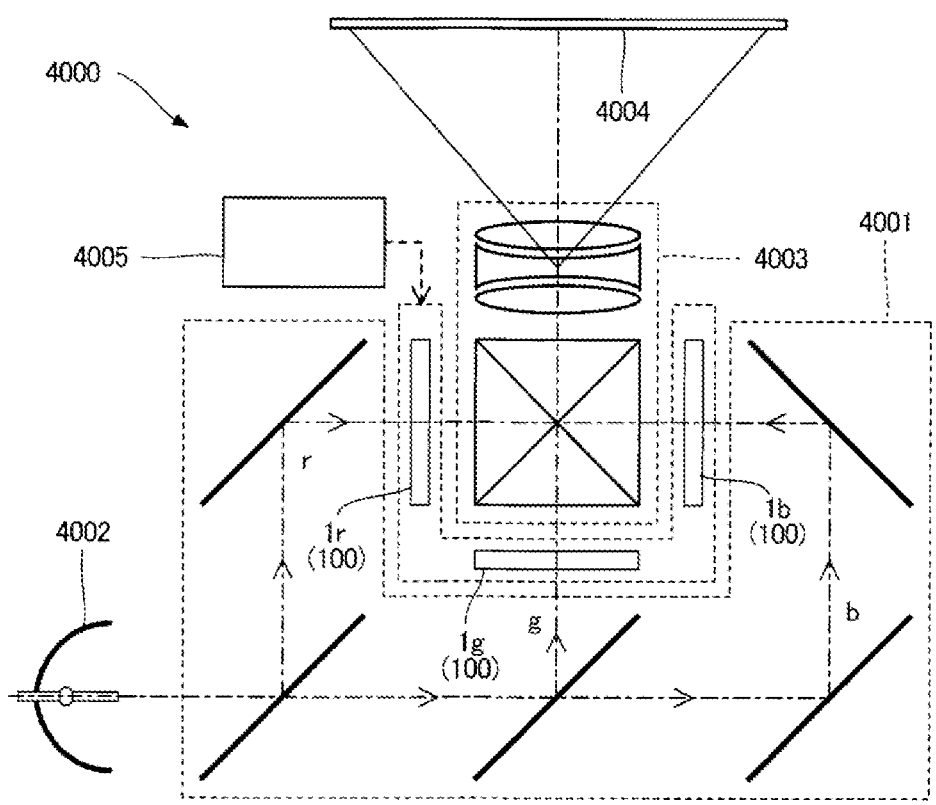
FIG. 13 is a schematic diagram illustrating a configuration of a projector as an example of an electronic apparatus.

FIG. 13 is a schematic diagram illustrating a configuration of a projector as an example of the electronic apparatus. A projection-type display apparatus 4000 is a three-plate type projector, for example. An electro-optical device 1r is the electro-optical device 100 corresponding to a red display color, an electro-optical device 1g is the electro-optical device 100 corresponding to a green display color, and an electro-optical device 1b is the electro-optical device 100 corresponding to a blue display color. That is, the projection-type display apparatus 4000 includes three pieces of the electro-optical devices 1r, 1g, and 1b that correspond to the red, green, and blue display colors, respectively. A control unit 4005 includes, for example, a processor and a memory to control the operation of the electro-optical device 100.

An illumination optical system 4001 is configured to supply a red component r of light emitted from an illumination device 4002 as a light source to the electro-optical device 1r, a green component g of the light to the electro-optical device 1g, and a blue component b of the light to the electro-optical device 1b. Each of the electro-optical devices 1r, 1g, and 1b functions as an optical modulator, such as a light valve, that modulates respective rays of monochromatic light supplied from the illumination optical system 4001 depending on display images. A projection optical system 4003 synthesizes the respective rays of the light emitted from the electro-optical devices 1r, 1g, and 1b, to project the synthesized light to a projection surface 4004.

The electronic apparatus described above includes the electro-optical device 100 described above, and the control unit 2003, 3002, or 4005. As described above, in the electro-optical device 100, the decrease in the opening ratio is suppressed, as well as the distance between the element substrate 2 and the counter substrate 4 is stabilized. This makes it possible to enhance a display quality of the personal computer 2000, the smartphone 3000, or the projection-type display apparatus 4000.

Note that, examples of the electronic apparatus to which the electro-optical device of the present disclosure is applied include, without being limited to the exemplified apparatuses, Personal Digital Assistants (PDA), digital still cameras, televisions, video cameras, car navigation devices, display devices for in-vehicle use, electronic organizers, electronic papers, electronic calculators, word processors, workstations, visual telephones, Point of sale (POS) terminals, and the like, for example. Further, examples of the electronic apparatus to which the present disclosure is applied further include apparatuses and the like provided with a printer, a scanner, a copier, a video player, or a touch panel.

The present disclosure has been described above based on the preferred embodiments, but the present disclosure is not limited to the above-described embodiments. In addition, the configuration of each of the components of the present disclosure may be replaced with any configuration that exerts equivalent functions to those in the above-described embodiments, and to which any configuration may be added.

Further, in the above description, the liquid crystal device is described as an example of the electro-optical device of the present disclosure, and the electro-optical device of the present disclosure is not limited to the liquid crystal device. For example, the electro-optical device of the present disclosure is also applicable to an image sensor or the like. For example, the present disclosure is also applicable to a display panel using light-emitting elements such as organic electroluminescence (EL) elements, inorganic EL elements, and light-emitting polymers, as in the above-described embodiments. Further, the present disclosure is also applicable to an electrophoretic display panel that uses micro capsules containing colored liquid and white particles dispersed in the liquid, as in the above-described embodiments.

What is claimed is:

1. An electro-optical device, comprising:
   a first substrate including a layered body including a plurality of insulating layers, and a pixel electrode disposed at the layered body;
   a second substrate including a common electrode;
   an electro-optical layer disposed between the pixel electrode and the common electrode, the electro-optical layer having optical characteristics varying according to an electric field;
   a spacer coupled to the first substrate, the spacer defining a distance between the pixel electrode and the common electrode, wherein
   the spacer has a first portion overlapping with the pixel electrode when viewed in a thickness direction of the first substrate, and a second portion not overlapping with the pixel electrode when viewed in the thickness direction, wherein a highest point of the first portion and a highest point of the second portion are located at a same level height, and an entire top surface of the first portion is located at a same level height,
   the first substrate further includes a protection portion that is disposed between the first portion and the pixel electrode, and
   the protection portion includes a metal oxide film, an insulating film, and a light-shielding film in this order from the pixel electrode.

2. The electro-optical device according to claim 1, wherein
   the spacer has a tip surface, wherein
   the tip surface has a second concave portion.

3. An electronic apparatus, comprising
   the electro-optical device according to claim 1, and
   a control unit configured to control operation of the electro-optical device.

4. The electro-optical device according to claim 1, wherein
   the layered body has a first concave portion where a part of the second portion is disposed.

5. The electro-optical device according to claim 4, wherein
   the second portion of the spacer has a second concave portion that is formed in conformance with a shape of the first concave portion, and the second concave portion is inside the first concave portion in a plan view.

6. The electro-optical device according to claim 1, wherein
   the spacer is composed of an inorganic material.

7. The electro-optical device according to claim 6, wherein
   the layered body contains the inorganic material, wherein
   the second portion is in contact with the layered body.

8. The electro-optical device according to claim 6, wherein
   the inorganic material includes silicon oxide or silicon oxynitride.

* * * * *